Patented Sept. 24, 1940

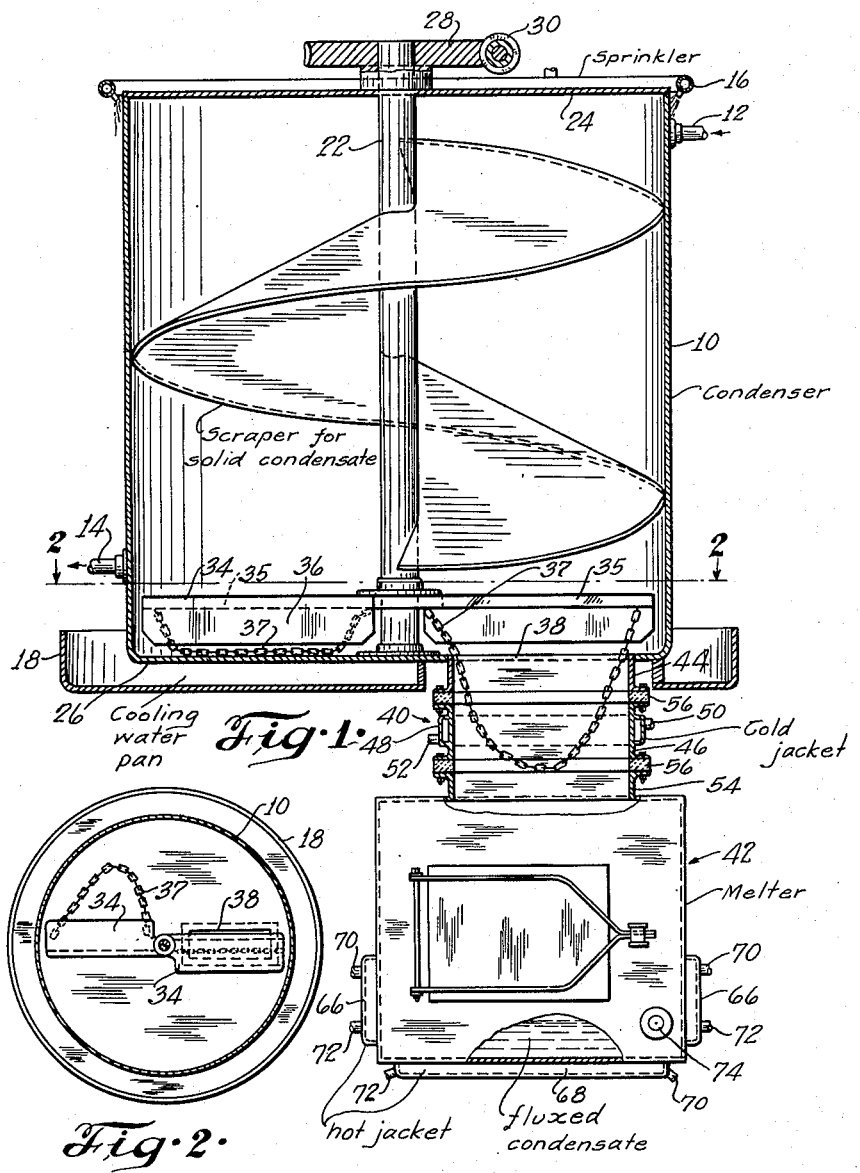

2,215,968

UNITED STATES PATENT OFFICE 2,215,968

METHOD FOR CONTINUOUSLY RECOVERING PHTHALIC ANHYDRIDE

John W. Livingston, Kirkwood, Mo., assignor to Monsanto Chemical Company, St. Louis, Mo., a corporation of Delaware Original application August 26, 1935, Serial No. 37,921. Divided and this application May 22, 1937, Serial No. 144,163

10 Claims. (Cl. 260—343)

The present invention relates to a method for recovering phthalic anhydride substantially free of maleic acid or anhydride from a hot vaporous reaction mixture containing the same, characterized by the fact that it is continuous, requiring little or no manual labor, thus minimizing health hazards, inexpensive to construct and operate, self-contained and requires very little floor space as compared to known recovery systems, at the same time permitting the maleic anhydride to be left in the vapor phase in a recoverable form.

This application is a continuation-in-part of my copending application, Serial No. 398,872, filed October 11, 1929, and a division of my copending application, Serial No. 37,921, filed August 26, 1935.

Most phthalic anhydride is manufactured by the so-called air oxidation method, according to which naphthalene vapors and air are conducted, under controlled temperature conditions, over vanadium oxide, which functions as a catalyst. The air and naphthalene vapor are usually introduced into the catalyst chamber in a ratio of 20 to 40 parts of air to 1 part of naphthalene by weight although higher or lower ratios may be desirable under some circumstances. Varying proportions of products other than phthalic anhydride such as maleic anhydride are necessarily formed by the commercial process, from 3–7% by weight of the naphthalene usually being converted to maleic anhydride. The reacted vapors are cooled from the reaction temperature of approximately 450–500° C. to a point where all or substantially all of the phthalic anhydride separates. Although phthalic anhydride melts at approximately 130° C., and in a crude form such as is recovered from the reacted mixture as low as 120–128° C., and boils at 284° C., it is necessary to cool the vapors well below the melting point, preferably as much as 40° or 50° C. or more, in order to make certain that the recovery of the anhydride is complete. This is important because of the large volume of diluent vapor and the appreciable vapor pressure of phthalic anhydride at temperatures as low as the melting point or even below. Consequently the product recovered is solid and not liquid as one might expect or hope. Under these conditions little or no maleic anhydride or acid separates out but remains in the vapor phase and is carried on by the other gases. In actual practice it has been found that the solid phthalic anhydride deposits upon the cool surfaces in long needles. However, where the vapors are chilled quickly, as is the case where a jet of water is sprayed against the cooling surface, the anhydride deposits as relatively dense, short needles which coat the surface of the condenser, thereby impeding the rate of heat transfer and consequently the efficiency of cooling the surface.

In my copending application, Serial No. 398,872, I have disclosed a method and apparatus wherein the reacted vapors are conducted through one or more condensers each consisting of a cylindrical tank which is cooled from the outside surface by a jet or film of water. The maleic anhydride passes out of the condenser with the gases; the deposit or crust of phthalic anhydride in the condenser is removed continuously by means of a set of scraping blades or a helical coil whereupon it falls by gravity to the funnel-shaped lower extremity of the condenser. Immediately below the condenser is a melting tank wherein the solid anhydride drops by gravity and is melted and finally withdrawn in a molten condition. From time to time, bridging over of solid phthalic anhydride tends to interrupt the operation of the device, whereupon it becomes necessary to dislodge the solid product and force it downwardly into the melter. This is overcome by means of heating coils disposed in the restricted juncture of the melter and condenser.

The improvements of my application, Serial No. 37,921, include means for maintaining the passage way between the condenser and the melter and the portions adjacent thereto at a relatively low temperature to obtain efficient and complete recovery of the anhydride product, means for assuring continuous operation and avoiding stoppage by reason of an accumulation or bridging over of anhydride at the point where the anhydride passes from the condenser to the melter, and more specifically means for assuring continued operation of the scraper and continuous delivery of the scraped product to the melter, while at the same time assuring complete removal of phthalic anhydride from the vapor, without condensing the maleic acid or anhydride.

The foregoing objects and purposes, together with others, will be more apparent from a consideration of the accompanying drawing and descriptions especially directed thereto of an embodiment of the principles of my invention which may be preferred.

Figure 1 is an elevational view, partly in cross-section, of one form which the invention may take; and Figure 2 is a cross-sectional view taken along the lines II—II of Figure 1, and on a somewhat smaller scale than Figure 1.

Figure 3 is a diagrammatic flow sheet illustrating an embodiment of the invention.

The present invention contemplates a continuous method of recovering normally solid materials, such as phthalic anhydride, from a dilute vaporous mixture thereof in which the anhydride vapors are condensed upon the walls of a chamber. They are scraped or dislodged from the condenser wall and deposited in a particular manner in a heated chamber which is thermally isolated, and yet which communicates directly with the first chamber. In this second chamber the solid material is melted down into fluid state.

In a preferred embodiment of the apparatus, a condenser in the form of a closed cylindrical container or tank 10 of suitable metal or other material is provided near its top with an inlet conduit 12 for vapors and gases and near the bottom thereof with an outlet conduit 14 for uncondensed materials. The container is cooled in any convenient manner, preferably by means of jets of water from spray pipes 16, which are directed at the vertical wall surfaces of the container adjacent the top thereof in order that the water may flow down the sides as a film. A pan 18 disposed under the container receives the water as it drips from the bottom of the container.

For purposes of removing the solids as they are condensed upon the inner surfaces of the container, a coaxially disposed shaft 22 is journaled in the top at 24 and the bottom at 26 of the container and is equipped upon its upper end, which projects through the container, with a drive mechanism of any convenient design. This mechanism may comprise a worm gear 28 fixed upon the shaft and a worm gear 30 in engagement therewith, the latter of which may be driven by an electrical motor (not shown). The shaft 22 carries a scraper blade or blades which may take the form of a continuous or segmented helix or spiral supported by the shaft as an axis, and terminating a short distance above the bottom 26 of the container 10. A cross-arm 34 is also secured to the shaft directly below the lower end of the scraper, and may in cross-section be of angular configuration, with a horizontal flange 35 and a vertical web 36. The lower edge of the web extends into proximity of and functions to sweep or scrape the bottom 26 of the container.

A chain 37 is attached in loops to arm 34 which drag upon the bottom 26 and function to knock the material detached by the scraper 32 into and through a rectangular eccentrically disposed radial opening 38 and throat 40 at the bottom of container 10. The throat, which is placed as far from the outlet 14 as conveniently possible, connects the container with a melter 42 and comprises a number of sections (three being shown), the upper one 44 of which is integrally formed with or otherwise suitably secured to the container. The intermediate section 46 is provided with a jacket 48 for cooling fluid which finds ingress and egress respectively through conduits 50 and 52. The lower section 54 is integrally formed with or otherwise attached to the melter 42. For purposes of further preventing the conductance of heat from the receiver through the walls of the throat to the condenser 10, relatively heavy gaskets 56 of asbestos or other insulating material are disposed between the flanged edges of the throat sections. Conventional bolts, extending through these flanges, function to compress the gaskets and thus to provide a vapor and gas tight seal.

The bottom of the melter 42 and two opposite lateral portions thereof are equipped with jackets 66 and 68 through which a heating fluid, such as hot water or steam is caused to circulate by means of inlet and outlet conduits 70 and 72.

Molten material from the bottom of the receiver 42 flows off to a tank or other receptacle through an outlet 74 which preferably extends through the wall of the receiver at a slight distance above the bottom, in order that a pool of anhydride is maintained in which the solid is fluxed. By supplying the heat for fluxing purposes directly into the pool of anhydride, materially improved operating efficiency of the condenser is realized.

Entrance into the receiver for purposes of cleaning or repairing is obtained through a sealed door 76, hinged or otherwise mounted upon the side wall of container 42.

Figure 3 is a flow sheet representing in diagrammatic form a preferred embodiment of this invention. The air-naphthalene mixture is introduced into the catalyst chamber where the conversion takes place. The products of the reaction are then optionally passed through a precooler in which heat is abstracted from them but not sufficiently to cause any substantial condensation before entering the phthalic anhydride condenser where the anhydride is condensed and recovered in a somewhat impure condition. The gases containing the maleic anhydride and some of the impurities pass on to a maleic recovery unit of conventional design, the maleic anhydride or acid being recovered in the usual manner and the spent gases are discharged.

The ratio of air and naphthalene introduced into the catalyst chamber is the usual ratio of preferably about 25 parts by weight of air to one part by weight of naphthalene though, of course, higher or lower ratios may be found advantageous under some conditions. See Marek and Hahn Catalytic Oxidation of Organic Compounds in the Vapor Phase, pp. 406 to 426. The conventional precooler, while preferable is not necessary since it functions merely to relieve the load on the condenser and as an aid in the recovery of heat.

The mode of operation of the apparatus is self-evident from the foregoing description. Vaporous material such as a mixture of phthalic anhydride, maleic anhydride, benzoic acid and water vapors together with air, carbon dioxide and nitrogen, which results from air oxidation of naphthalene is introduced into the condenser tank 10 through the inlet conduit 12 while jets of water from the sprayer 16 are projected upon side walls thereof and flow downwardly and drip off into the waste water pan 18. Upon contact with the chilled side walls the vaporized phthalic anhydride, benzoic acid and the like are condensed as a solid, usually of crystalline nature which adheres to the walls of the condenser. Even when the vapors are cooled to 80° C. however, substantially no maleic anhydride or acid condenses, but the recovery of phthalic anhydride by condensation is substantially complete. The maleic may be recovered from the gases leaving the phthalic anhydride condenser by means such as a non-aqueous solvent for maleic anhydride or by scrubbing them with water, in which case it is, of course, recovered as maleic acid. The phthalic anhydride deposits in the condenser are dislodged by the rotating scraper and fall upon the bottom 26 where they are swept along by the bar flange 35 and chain 37 until finally they drop through the relatively cool throat 40 into the receiver 42. The solid drops into the pool where it is fluxed and from which the molten material flows off through conduit 74 for further treatment or for storage.

From the foregoing description it will be apparent that a relatively simple embodiment of apparatus has been provided, which is capable of efficiently condensing a normally solid material from its vapor phase in a continuous manner and in a substantially completely closed system. At the same time, the product is obtained in molten condition and may be handled with minimum expenditure of labor, maximum economy of space and with practically complete elimination of disagreeable vapors within the factory.

In this apparatus there is little or no tendency for the throat 40 to clog or choke and the knocking action afforded by the dropping of the loops of the chain 37 into the throat is found to be adequate to keep it clear. The cool throat is highly advantageous from a technical point of view, because it prevents conduction of heat and convection of hot vapors from the melter into the condenser thereby impairing the efficiency of the condenser and causing loss of anhydride product.

What I claim is:

1. The method of continuously recovering phthalic anhydride from a dilute vapor mixture thereof obtained by the catalytic air oxidation of naphthalene which comprises passing the vapors in heat exchange relationship with a relatively cool surface whereby the anhydride deposits as a solid on the surface, mechanically dislodging the solid condensate from the surface, and mechanically delivering the condensate to a pool of molten phthalic anhydride which is thermally isolated from said cool surface by means of a cooled throat.

2. The method as defined in claim 1 and further characterized in that the dilute vapor mixture is cooled by the relatively cool surface to a temperature such that substantially all of the phthalic anhydride is removed from the vapor free of maleic acid and anhydride and substantially none of the maleic is deposited out.

3. The method of continuously recovering phthalic anhydride from a dilute vapor mixture obtained by the catalytic air oxidation of naphthalene containing relatively small amounts of phthalic anhydride and maleic anhydride which comprises passing the vapors in heat exchange relationship with a cool surface whereby the gases are cooled to a temperature below the melting point of phthalic anhydride to condense substantially all of the phthalic but sufficiently high so that substantially no maleic anhydride or acid is condensed, then collecting the condensate in a pool of molten phthalic anhydride which is thermally isolated from said cool surface but physically connected thereto by means of a cooled conduit.

4. The method of continuously recovering phthalic anhydride substantially free of maleic anhydride and acid from the vapor mixture obtained by the catalytic air oxidation of naphthalene which comprises contacting the vapors with a cool surface whereby the gases are cooled to a temperature of 80–110° C. thus causing substantially all of the phthalic anhydride to be condensed as a solid on the cool surface while substantially all of the maleic acid and anhydride remains in the vapor phase, then collecting the condensate in a pool of molten phthalic anhydride which is thermally isolated from said cool surface but physically connected thereto by means of a conduit whose walls are cooled.

5. The method of continuously recovering phthalic anhydride substantially free of maleic anhydride and acid from the vapor mixture obtained by the catalytic air oxidation of naphthalene which comprises contacting the vapors with a cool surface whereby the gases are cooled to a temperature of 80–110° C. thus causing substantially all of the phthalic anhydride to be condensed as a solid on the cool surface while substantially all of the maleic acid and anhydride remains in the vapor phase, then collecting the condensate in a pool of molten phthalic anhydride which is thermally isolated from said cool surface but physically adjacent thereto being connected thereto by means of a cooled conduit.

6. The method of continuously recovering phthalic anhydride substantially free of maleic anhydride and acid from the vapor mixture obtained by the catalytic air oxidation of naphthalene which comprises continuously introducing the vapors into a chamber having cool walls, whereby the vapors are cooled to a temperature below the melting point of phthalic anhydride to condense substantially all of the phthalic but sufficiently high so that substantially no maleic anhydride or acid is condensed, continuously withdrawing the uncondensed vapors, and continuously collecting the condensate from the walls of the chamber into a pool of molten phthalic anhydride which is thermally isolated from said chamber by means of an interconnecting cooled conduit.

7. In the manufacture of phthalic anhydride by the catalytic air oxidation of naphthalene whereby a vapor mixture of phthalic anhydride, maleic anhydride and gaseous by-products of the reaction are obtained, the step of recovering phthalic anhydride from the mixture while maintaining the maleic anhydride in the gaseous state which comprises passing the vapors in heat exchange relationship with a relatively cool surface which is at a temperature such that substantially complete condensation of the phthalic anhydride is obtained without condensing the maleic anhydride, then discharging the gaseous maleic anhydride and other gaseous reaction products and mechanically dislodging the deposited phthalic anhydride from the cooled surface and mechanically delivering the condensate through a thermally isolated, cooled zone to a melter and then withdrawing the molten phthalic anhydride from the melter.

8. The method of continuously recovering phthalic anhydride substantially free of maleic anhydride and acid from the vapor mixture obtained by the catalytic air oxidation of naphthalene which comprises contacting the vapors with a cool surface whereby the anhydride deposits as a solid on the surface, mechanically dislodging the solid condensate from the surface and mechanically delivering the condensate through a passageway to a pool of molten phthalic anhydride while maintaining the passageway between the cool surface and the molten pool free from obstruction by intermittently lowering and retracting a flexible gravity-actuated dislodging element in said passageway.

9. The method of continuously recovering phthalic anhydride substantially free of maleic anhydride and acid from the vapor mixture obtained by the catalytic air oxidation of naphthalene which comprises contacting the vapors with a cooled surface whereby the anhydride deposits as a solid on the surface dislodging the solid condensate from the surface and delivering the condensate through a passageway to a pool of molten phthalic anhydride while maintaining the passageway between the cooled surface and the molten pool free from obstruction by intermittently lowering and retracting a flexible gravity-actuated dislodging element in said passageway and while thermally isolating the molten pool from the cooled surface.

10. The method of continuously recovering phthalic anhydride substantially free of maleic anhydride and acid from the vapor mixture obtained by the catalytic air oxidation of naphthalene which comprises contacting the vapors with a cool surface whereby the anhydride deposits as a solid on the surface, mechanically dislodging the solid condensate from the surface and mechanically delivering the condensate through a passageway to a pool of molten phthalic anhydride while maintaining the passageway between the cool surface and the molten pool free from obstruction by intermittently lowering and retracting in said passageway, chains.

JOHN W. LIVINGSTON.